United States Patent [19]

Zimmerman

[11] Patent Number: 5,558,039
[45] Date of Patent: Sep. 24, 1996

[54] HOG FEEDER

[75] Inventor: Leon S. Zimmerman, Lititz, Pa.

[73] Assignee: Staco, Inc., Schaefferstown, Pa.

[21] Appl. No.: 570,301

[22] Filed: Dec. 11, 1995

[51] Int. Cl.⁶ .................................................. A01K 5/00
[52] U.S. Cl. ................................................... 119/52.1
[58] Field of Search ......................... 119/52.1, 53, 53.5, 119/54, 56.1

[56] References Cited

U.S. PATENT DOCUMENTS

| | | | |
|---|---|---|---|
| 3,602,195 | 8/1971 | Blough | 119/52.1 X |
| 3,866,576 | 2/1975 | Downing | 119/52.1 X |
| 4,180,014 | 12/1979 | Mathews | 119/52.1 |
| 4,401,056 | 8/1983 | Cody et al. | 119/54 |

*Primary Examiner*—Nicholas D. Lucchesi
*Assistant Examiner*—Thomas Price
*Attorney, Agent, or Firm*—John G. Mills and Associates

[57] ABSTRACT

An improved livestock feeder for use with an automatic feed delivery system having a feed drop tube operatively connected thereto for dispensing feed into a feed bin. The improved feeder features a feed drop tube holder fabricated from a flexible, resilient material which is installed intermediate the opposed side walls of the feed bin by compressing the holder lengthwise with hand pressure to effectively reduce its overall length and to allow tabs formed on the ends thereof to engage a plurality of horizontally opposed slots formed in the opposed side walls. The holder is next released and springs back to its original flat configuration so that the tabs engage the slots and the holder is retained intermediate the opposed side walls. The flexible holder includes a central opening that is adapted to loosely receive a feed drop tube associated with the automatic feed delivery system. The improved feeder also features outwardly and downwardly projecting flanges integrally formed at the upper edges of the side walls which function to protect the exposed tabs and are of sufficient strength to function as handles for lifting the feeder. The flange configuration provides convenient access to the interior of the feed bin for maintenance and sanitation purposes.

8 Claims, 3 Drawing Sheets

HOG FEEDER

CLAIM OF BENEFIT OF PROVISIONAL APPLICATION

Claim is hereby made to the benefit under Title 35, United States Code, §119(e) of United Stated Provisional patent application Ser. No. 60/000,028, filed Jun. 8, 1995, entitled IMPROVED HOG FEEDER, by Leon S. Zimmerman.

FIELD OF INVENTION

This invention relates to animal feed dispensers and more particularly, to animal feed dispensers for use in conjunction with automatic feed delivery systems.

BACKGROUND OF INVENTION

In the conventional practice of animal husbandry, the animal feed is often delivered manually to a funnel-shaped, gravity feeder from which the contents can be distributed slowly for consumption by the livestock.

Modernly, the livestock industry utilizes automatic feed delivery systems including feed drop tubes operatively connected to a feed storage container or a similar device for the distribution of feed. In the present practice a feed drop tube attached to the automatic feed delivery system must be held manually by the operator in alignment with the feeder or attached by makeshift means thereto to avoid spillage and waste of the feed product.

Further, the prior art feeders invariably include inwardly projecting upper peripheral flanges about the top edge of the feeder bin which tend to interfere with feed delivery and make cleaning and maintenance of the feeder difficult which can cause bacterial growth and related health problems for the animals.

BRIEF DESCRIPTION OF INVENTION

After much research and study into the above mentioned problems, the present invention has been developed to provide an improved livestock feeder for use with automatic feed delivery systems featuring a feed drop tube holder.

The feed drop tube holder of the present invention is a generally flat, rectangular device having a circular opening in the center thereof. The holder is fabricated from a resilient material which allows the device to be compressed by hand pressure and to return to its original shape without fatigue after repeated use.

The holder is sized to an overall dimension that is slightly larger than the distance between the vertically opposed side walls in the feed bin of the feeder. The holder is provided with a plurality of tabs projecting from the ends thereof that are adapted to engage a plurality of pre-existing slots in the side walls of the feed bin.

Thus, the holder may be installed by compressing the device into a curved bow shape and inserting the tabs formed in the ends thereof into corresponding slots on the side walls of the feed bin. The holder is then released and is captured between the opposed side walls and retained in position.

The holder of the present invention may be installed in different longitudinal positions within the feed bin by providing additional slots therein.

To accommodate the installation of the feed drop tube holder within the bin of the improved feeder, the flanges formed about the upper peripheral edge of the feed bin are disposed outwardly and downwardly covering the exposed tabs on the holder which protrude through the corresponding slots in the side walls of the feed bin.

Another advantage of the outwardly and downwardly disposed flanges of the side walls of the improved feeder of the present invention is that the feed bin may be more easily cleaned since the resulting interior surfaces of the side walls are more accessible having no inwardly projecting edges which would trap food and other debris, resulting in improved sanitation of the device.

In view of the above it is an object of the present invention to provide an improved livestock feeder featuring a feed drop tube holder for use in conjunction with an automatic feed delivery system.

Another object of the present invention is to provide an improved livestock feeder including a feed drop tube holder that is made of a resilient material that can be repeatedly bent during installation of the same and will spring back to its original shape.

Another object of the present invention is to provide an improve livestock feeder having a feed drop tube holder that does not require additional brackets or hardware to install.

Another object of the present invention is to provide an improved livestock feeder having flanges formed about the top peripheral edges thereof which are disposed outwardly and downwardly resulting in a feed bin having accessible interior surfaces to facilitate cleaning and sanitation thereof.

Other objects and advantages of the present invention will become apparent and obvious from a study of the following description and the accompanying drawings which are merely illustrative of such invention.

DETAILED DESCRIPTION OF INVENTION

Figure 1:
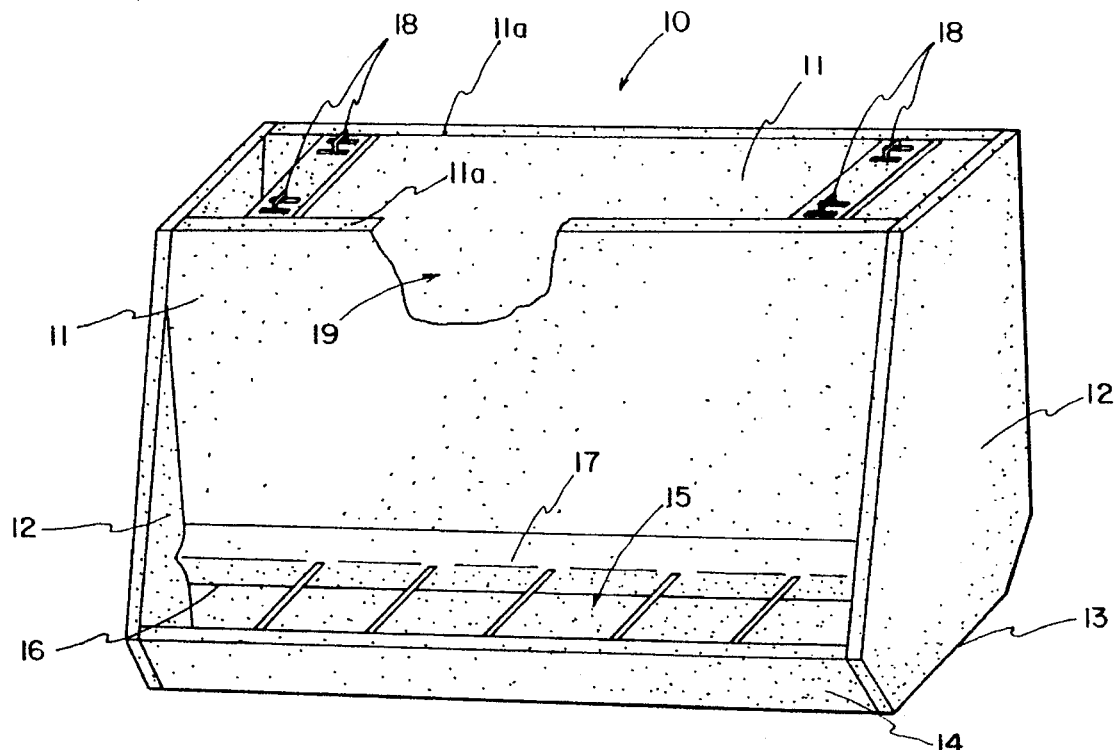
FIG. 1 is a conventional animal feeder of the prior art and is provided for comparison purposes.

As background, to better understand by comparison the improved livestock feeder of the present invention to be described in detail, reference should be made to the animal feeder illustrated in FIG. 1 and labeled Prior Art.

The Prior Art animal feeder, indicated generally at 10, comprises an open-topped hopper, indicated generally at 19, defined by opposing, downwardly sloping side walls 11 and opposing substantially vertical end walls 12.

The opposing end walls 12 are of generally rectangular shape and their upper edges are preferably positioned on substantially the same level as the upper edges of the downwardly sloping side walls 11. The lower edges of the opposing end walls 12 terminate at a substantial distance below the lower edges of the opposing side walls 11 and are suitably secured to opposed ends of a bottom wall 13.

The bottom wall 13 is connected to upwardly and outwardly inclined outer panel portions 14 forming elongate feed troughs, indicated generally at 15, along opposite sides of the animal feeder 10 and below the opposing side walls 11.

The lower portions of the downwardly converging side walls 11 and the bottom wall 13 define therebetween a feed discharge opening 16.

As another element of the feeder 10, the upper peripheral edges 11a of side walls 11 are disposed in generally perpendicular relation thereto and project inwardly so as to overhang the interior surfaces of side walls 11.

In the feeding of animals such as pigs using feeder 10, finely ground dry feed (not shown) is dumped into the open-topped hopper where it is gravity fed through the feed discharge opening 16 and/or metering gates 17. Feeder 10 may be equipped with agitating apparatus (not shown) or gate adjustment means 18 to assure the free flow of feed therefrom.

Since such conventional animal feeders are well-known in the Prior Art, further detailed discussion of the same is not deemed necessary.

Figure 2:
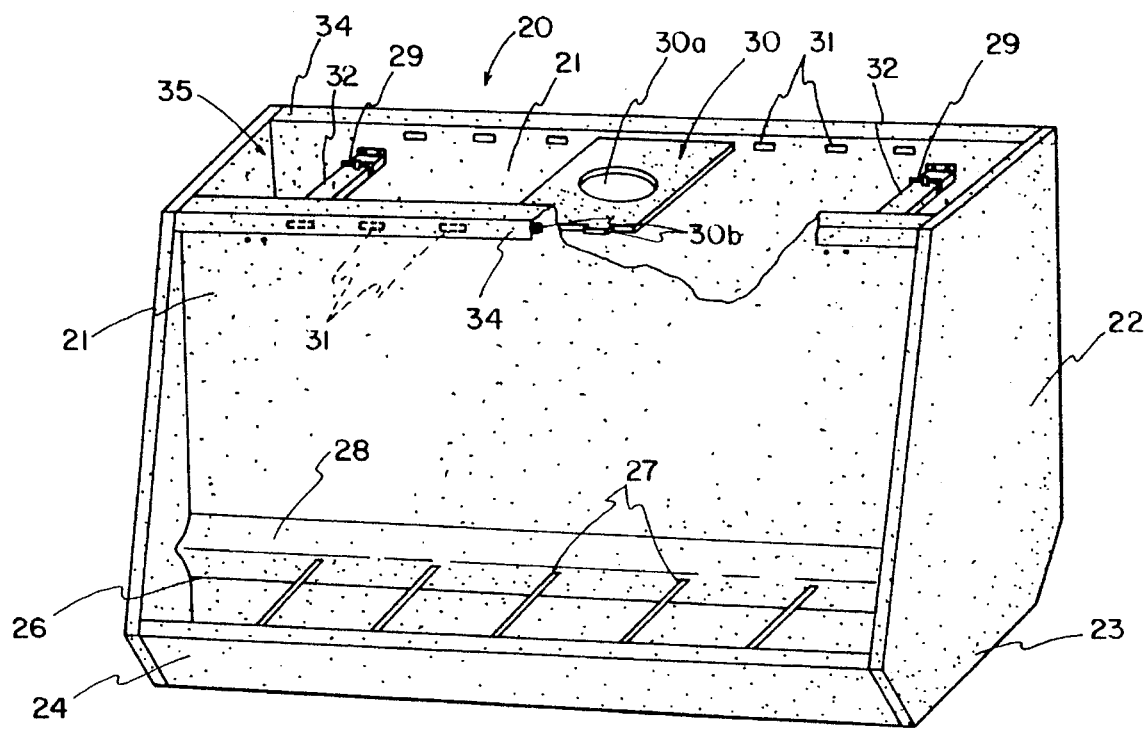
FIG. 2 is a perspective view of the improved livestock feeder of the present invention including a partial cut away view showing the feed drop tube holder installed in operative position.

Referring now to the improved livestock feeder of the present invention as shown in FIG. 2 and indicated generally at 20, it will be seen that it also contemplates the use of an open-topped feed bin, indicated generally at 35, defined by opposing downwardly converging side walls 21 and substantially vertically disposed end walls 22.

The opposing end walls 22 are also of substantially rectangular shape and their upper edges are positioned on substantially the same level as the upper edges of the opposing, downwardly converging side walls 21.

Similarly the lower edges of the opposing end walls 22 terminate at a substantial distance below the lower edges of the opposing side walls 21 and are secured to opposed ends of a bottom wall 23 which is preferably of one-piece construction.

The opposed lateral edges of bottom wall 13 are connected to upwardly and outwardly inclined outer trough portions 24, thus forming a pair of elongate feed troughs 25 along opposite sides of the feeder 20 similar to those of the Prior Art feeder 10.

The lower portions of the downwardly converging side walls 21 define therebetween a feed discharge opening 26.

As another element of the feeder 20, reinforcing dividers, shown in the form of a plurality of spaced-apart, elongate rods 27 span the feed troughs 25 from the side walls 21 to respective outer trough portions 24 of the bottom wall 23. The rods 27 reinforce the feed bin and divide each feed trough 25 into individual feeding areas which serve to aid in giving the livestock animals access to feed.

As in the Prior Art feeder 10, a pair of elongate, pivotedly mounted, vertically adjustable gates 28 including gate adjustment means 29 mechanically coupled thereto overlie the respective feed discharge openings 26 for varying the size of each opening 26. The gates 28 extend longitudinally between the end walls 22 with the opposite ends of the gates 28 terminating closely adjacent end walls 22. A small clearance remains necessary between the ends of the gates 28 and the end walls 22, so that the gates 28 may pivot freely in their described adjusted positions.

Since all of the hereinabove described features of feeder 20 are well known to those skilled in the art, further detailed discussion of the same is not deemed necessary.

One of the principal improvements of feeder 20 of the present invention is the feed drop tube holder, indicated generally at 30, as shown in FIG. 2. In the preferred embodiment, feed drop tube holder tube 30 is a generally flat, rectangular structure having a circular opening 30a in the center thereof.

Holder 30 includes a plurality of tabs 30b integrally formed on opposite ends thereof at predetermined intervals. Tabs 30b are adapted to engage a plurality of cooperating slots 31 which are disposed about the upper peripheral edges of side walls 21 at regular intervals.

It will be appreciated by referring to FIG. 2 that there are more slots 31 provided in the upper edges of side walls 21 than there are tabs 30b on the holder 30 enabling holder 30 to be positioned at various locations within the feed bin 35.

One of the principal advantages of the feed drop tube holder 30 of the present invention is that it does not require brackets or additional hardware to install. Holder 30 is manufactured to an overall length that is slightly larger than the inside dimension between opposing side walls 21 as measured in a plane coincident with slots 31.

Figure 3:
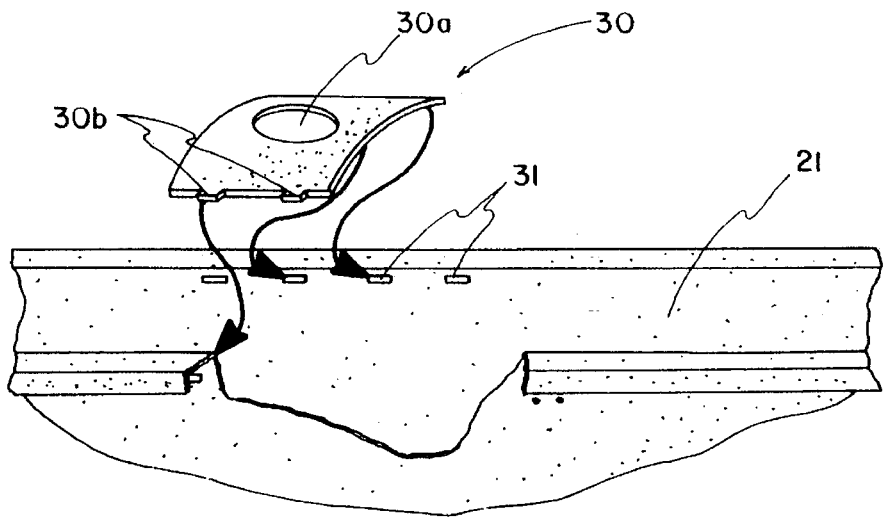
FIG. 3 is an enlarged detailed perspective view of the livestock feeder of the present invention showing the feed drop tube holder being prepared for installation.

Being made of a flexible, resilient material, holder 30 may be compressed lengthwise by hand pressure into a curved bow shape in order to insert tabs 30b into cooperating slots 31 as more clearly shown in FIG. 3.

Once released from this position, holder 30 springs back into its original flat configuration such that tabs 30b project outwardly through slots 31 in side walls 21 retaining holder 30 therebetween.

Figure 4:
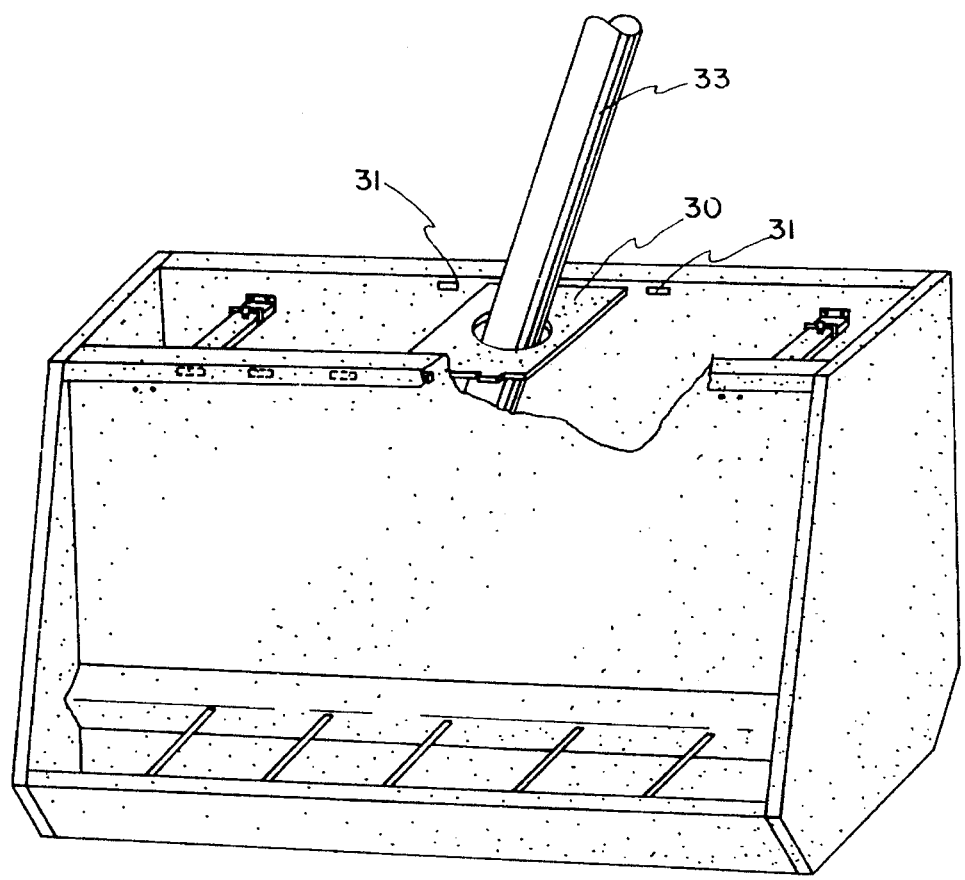
FIG. 4 is a perspective view of the improved livestock feeder of the present invention showing the feed drop tube associated with an automatic feed delivery system (not illustrated) installed within the feed drop tube holder.

The central opening 30a in holder 30 is sized to a dimension that is slightly larger than the feed drop tube 33 to accommodate the insertion of the same into central opening 30a at varying angles without binding therein as shown in FIG. 4.

It will appreciated by those skilled in the art that holder 30 may be easily repositioned to any of several different longitudinal positions within feeder 20 by removing and replacing holder 30 to different grouping of opposed slots 31 as desired.

Another principal improvement of the feeder 20 of the present invention can be seen by referring again to FIG. 2. The upper edges of side walls 21 terminate in an outwardly and downwardly projecting flange 34 that covers and protects the exposed tabs 30b of holder 30 which extend through slots 31 to the exterior of side walls 21.

It can be seen that gate adjustment means 29 have been relocated on brackets 32 which are fixedly attached to opposed side walls 21 by suitable fastening means 36 to accommodate the improved flanges 34.

Since feeder 20 in the preferred embodiment is fabricated entirely of stainless steel, flanges 34 impart added rigidity and strength to the feeder construction and, thus, may serve as a convenient handle for gripping and transporting feeder 20 to a desired location.

Another principal advantage of the improved feeder 20 resulting from the outwardly and downwardly disposed flanges 34 is that the interior surfaces of side walls 21 are relatively unobstructed and accessible for cleaning purposes when compared to the Prior Art feeder 10 depicted in FIG. 1.

It can be seen that the Prior Art feeder 10 shown in FIG. 1 includes a flange portion 11a of side walls 11 which overhangs the interior surfaces thereof preventing convenient access for cleaning and maintenance purposes.

Figure 5:
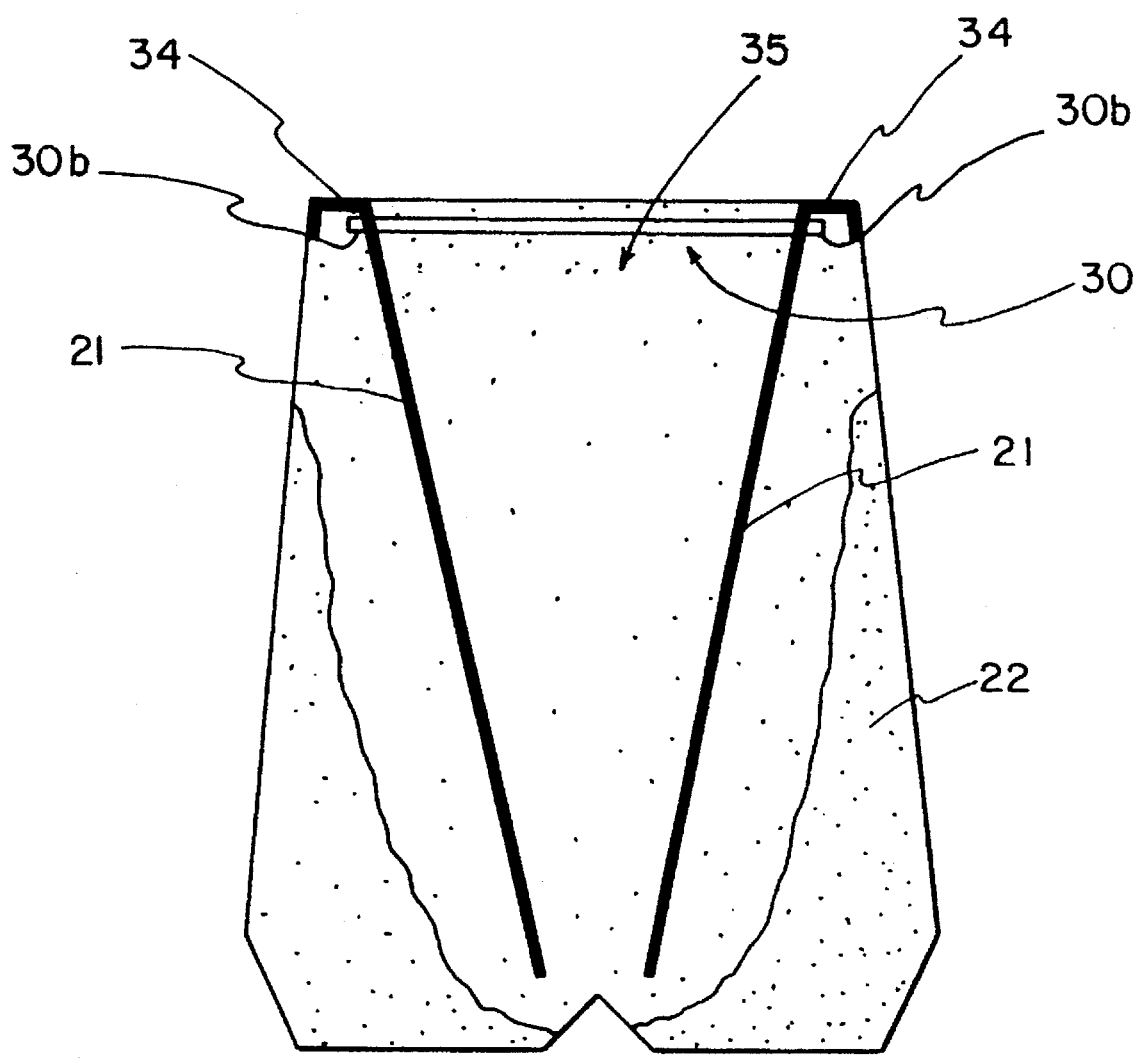
FIG. 5 is a side elevational view of the improved livestock feeder including a partial cutaway view showing the opposed side walls with the outwardly and downwardly projecting flanges extending therefrom.

In contrast the improved feeder 20 as shown in FIG. 5 provides more convenient access to the interior surfaces of side walls 21 when holder 30 is removed eliminating those inaccessible areas under the flange 11a where bacterial growth and undesirable sanitary conditions can occur. The maintenance and sanitation of such animal feeders is a significant concern to those persons involved in animal husbandry for obvious economic reasons. Also the outwardly and downwardly projecting flanges 34 act as convenient handles for moving the feeders.

From the above it can be seen that the improved livestock feeder of the present invention provides significant improvements over the animal feeders of the Prior Art. The improved feeder features a feed drop tube holder that is adapted for use with automatic feed delivery systems being used in the livestock industry. The feed drop tube holder of the present invention may be conveniently attached the feeder without additional mounting brackets or hardware.

The improved feeder of the present invention also includes outwardly and downwardly disposed flanges about upper edges of the side walls of the feed bin imparting added strength and rigidity to the same and also providing a convenient hand grip for transporting the feeder to a desired location.

Finally, the improved feeder of the present invention provides a more accessible feed bin for sanitation and maintenance purposes which provides obvious economic advantages to the livestock breeder.

The terms "upper", "lower", "side", "top", "bottom", and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. An improved livestock feeder for use with an automatic feed delivery system having a feed drop tube operatively connected thereto for dispensing feed into said feeder, said improvements comprising:

an open-topped feed bin defined by a pair of opposed, downwardly converging side walls and a pair of opposed end walls fixedly attached thereto;

a plurality of horizontally opposed slots formed in the upper edges of said side walls and being arranged linearly at predetermined intervals, each of said slots being disposed in substantial alignment with an opposing slot formed in each respective opposed side wall; and a feed drop tube holder means fabricated from a resilient material and being sized to an overall dimension that is slightly larger than the distance between said opposed side walls, said holder means being capable of compression into a curved bow shape by hand pressure to a reduced overall dimension to permit a plurality of tabs formed on the ends thereof to engage said slots in said side walls whereby when said holder is released from a compressed condition, it springs back to its original shape and is captured between said side walls.

2. The improved livestock feeder of claim 1 wherein each of said side walls has outwardly and downwardly projecting flanges integrally formed along the upper edges thereof enabling convenient access to the interior surfaces of said side walls for cleaning and maintenance purposes.

3. The improved livestock feeder of claim 1 wherein said holder means comprises a flat, generally rectangular structure having a central opening therein that is adapted to receive said feed drop tube.

4. The improved livestock feeder of claim 3 wherein said central opening is circular in shape.

5. The improved livestock feeder of claim 2 wherein said outwardly and downwardly projecting flanges are disposed in juxtaposition to said slots to enable said tabs installed therein to be covered and protected.

6. The improved livestock feeder of claim 5 wherein said outwardly and downwardly projecting flanges are formed to be used as handles for lifting said feeder.

7. The improved livestock feeder of claim 6 wherein the interior surfaces of said side walls adjacent said flanges comprise a smooth, continuous surface to facilitate cleaning thereof.

8. The method of dispensing feed into a livestock feeder using an automatic feed delivery system having a feed drop tube operatively connected thereto, said feeder including a feed bin defined by a pair of opposed, downwardly converging side walls, said side walls including a plurality of slots formed in the upper edges thereof at periodic intervals and being arranged linearly so that each respective slot is disposed in substantial alignment with an opposing slot on said opposed side walls, a pair of opposed end walls fixedly attached to said side walls, and a bottom wall means fixedly attached at the lower edges of said side walls and said end walls forming elongate feed troughs along opposite sides of said feeder and below said opposed side walls, said method comprising:

providing a feed drop tube holder means made from a resilient material and being sized to an overall dimension that is slightly larger than the distance between said opposed side walls, said holder means having a plurality of tabs integrally formed on the ends thereof for installation within said slots, compressing said holder means by hand pressure into a curved bow shape thereby decreasing its overall length;

positioning said holder means between said opposed side walls adjacent said slots;

inserting each respective end of said holder means having said tabs formed thereon into said slots in each respective wall;

releasing said holder means enabling the same to spring back to its original flat, rectangular shape whereby said tabs are extended outwardly through said slots retaining said holder means within said feed bin;

placing said feed drop tube within a central opening formed in said holder means to retain said tube in said feed bin; and dispensing said feed from said automatic feed delivery system into said feeder for consumption.

\* \* \* \* \*